United States Patent
Raikar et al.

(10) Patent No.: US 11,688,416 B2
(45) Date of Patent: *Jun. 27, 2023

(54) METHOD AND SYSTEM FOR SPEECH EMOTION RECOGNITION

(71) Applicant: SLING MEDIA PVT LTD, Bangaluru (IN)

(72) Inventors: Yatish Jayant Naik Raikar, Bangalore (IN); Varunkumar Tripathi, Karnataka (IN); Kiran Chittella, Bangalore (IN); Vinayak Kulkarni, Nargund (IN)

(73) Assignee: DISH Network Technologies India Private Limited

(*) Notice: Subject to any disclaimer, the term of this patent is extended or adjusted under 35 U.S.C. 154(b) by 0 days.

This patent is subject to a terminal disclaimer.

(21) Appl. No.: 17/446,385

(22) Filed: Aug. 30, 2021

(65) Prior Publication Data

US 2021/0390973 A1     Dec. 16, 2021

Related U.S. Application Data

(63) Continuation of application No. 16/677,324, filed on Nov. 7, 2019, now Pat. No. 11,133,025.

(51) Int. Cl.
  *G10L 25/63*   (2013.01)
  *G10L 15/02*   (2006.01)
  *G10L 15/22*   (2006.01)
  *G10L 15/26*   (2006.01)

(52) U.S. Cl.
  CPC ........... *G10L 25/63* (2013.01); *G10L 15/02* (2013.01); *G10L 15/22* (2013.01); *G10L 15/26* (2013.01); *G10L 2015/027* (2013.01)

(58) Field of Classification Search
  CPC ......... G10L 25/63; G10L 15/02; G10L 15/22; G10L 15/26; G10L 1015/027
  USPC ....................................................... 704/235
  See application file for complete search history.

(56) References Cited

U.S. PATENT DOCUMENTS

| | | |
|---|---|---|
| 2,537,240 A | 1/1951 | Shaw, Jr. |
| 8,204,749 B2 | 6/2012 | Hakkani-Tur et al. |
| 8,407,055 B2 | 3/2013 | Asano et al. |
| 8,788,270 B2 | 7/2014 | Patel et al. |
| 9,031,293 B2 | 5/2015 | Kalinli-Akbacak |
| 9,413,891 B2 * | 8/2016 | Dwyer .............. H04M 3/42221 |
| 9,542,927 B2 | 1/2017 | Agiomyrgiannakis et al. |

(Continued)

FOREIGN PATENT DOCUMENTS

EP     0314838 A1    5/1989

*Primary Examiner* — Susan I McFadden
(74) *Attorney, Agent, or Firm* — KW Law, LLP

(57) ABSTRACT

Systems and methods enrich speech to text communications between users in speech chat sessions using a speech emotion recognition model to convert observed emotions in speech samples to enrich text with visual emotion content. The method may include generating a data set of speech samples with labels of a plurality of emotion classes, selecting a set of acoustic features from each of the emotion classes, generating a machine learning (ML) model based on the acoustic features and data set, applying the set of rules based on the selected set of acoustic features and data set, computing a number of rules that have been satisfied, and presenting the enriched text in speech-to-text communications between users in the chat session for visual notice of an observed emotion in the speech sample.

20 Claims, 12 Drawing Sheets

(56) References Cited

U.S. PATENT DOCUMENTS

| | | | |
|---|---|---|---|
| 10,796,294 B2 * | 10/2020 | Van Os | G06Q 20/102 |
| 11,010,645 B2 | 5/2021 | Xu et al. | |
| 11,011,183 B2 | 5/2021 | Shao et al. | |
| 11,133,025 B2 * | 9/2021 | Raikar | G10L 25/63 |

* cited by examiner

METHOD AND SYSTEM FOR SPEECH EMOTION RECOGNITION

CROSS-REFERENCE TO RELATED APPLICATIONS

This application is a continuation of the parent application of the U.S. patent application Ser. No. 16/677,324, filed on Nov. 7, 2019, the contents of which are hereby incorporated by reference in its entirety.

TECHNICAL FIELD

The present invention generally relates to speech recognition and more particularly to a method and system for speech recognition to classify and predict voice messages and commands by extracting properties from voice samples and augmenting a presentation of the converted text of the voice samples to the user.

BACKGROUND

Human voice signals can provide a good correlation with the emotional status of a person. The mood of a person can be figured out by observing the tone of his speech. Speech recognition is the process of converting a speech signal into a sequence of words. It may also be referred to as Automatic Speech Recognition (ASR) or Speech-to-Text (STT). The use of speech recognition has become ubiquitous and is used in many aspects of daily life. For example, speech-to-text processing (e.g., word processors or emails), and personal assistants on mobile phones (e.g., APPLE®'s SIRI® on iOS®, GOGGLE® Home on ANDROID®).

Current speech recognition systems use speaker-dependent speech engines which depend on knowledge of a particular speaker's voice characteristics to achieve the required accuracy levels. This kind of speech engine must be trained for a particular user before the speech engine can recognize the speech of the user. Often, when performing the speech-to-text conversions, human emotional content is observed when processing the received speech. However, conventional trained speech recognition systems do not adequately re-create the human emotional content Hence, it is desirable to address these inadequacies raised in speech recognition in communications particularly in a speech to text chat applications where voice emotion content is observed but is not represented in text communications. The present disclosure addresses at least this need.

BRIEF SUMMARY

A method and system are provided for improving the emotion content displayed in speech recognition in speech samples with observed emotion content during speech to text chat communications.

In an exemplary embodiment, a method for speech emotion recognition for enriching speech-to-text communications between users in a speech chat session is provided. The method includes: implementing a speech emotion recognition model to enable converting observed emotions in a speech sample to enrich the text with visual emotion content in a speech to text communications by generating a data set of speech samples with labels of a plurality of emotion classes; extracting a set of acoustic features from each of a plurality of emotion classes; generating a machine learning (ML) model based on at least one of the set of acoustic features and data set; training the ML model from acoustic features from speech samples during speech chat sessions; predicting emotion content based on a trained ML model in the observed speech; generating enriched text based on predicted emotion content of the trained ML model; and presenting the enriched text in a speech to text communications between users in the speech chat session for visual notice of an observed emotion in the speech sample.

The method further includes the enriching text in the speech to text communications by changing a color of a select set of the text of word in a phrase of a converted speech sample in the speech to text communications in the chat session for the visual notice of the observed emotion in the speech sample. The method further includes the enriching text in the speech to text communications by including an emoticon symbol and shading with one or more colors different parts of the emoticon symbol in a speech to text communications of a converted speech sample in the speech to text communications in the chat session for the visual notice of the observed emotion in the speech sample by color shading in one or more of the different parts of the emoticon symbol. The method further includes the changing dynamically consistent with a change of the observed emotion in the speech sample, the color shading in one or more of the different parts of the emoticon symbol wherein the change in color shading occurs gradually.

The method further includes changing dynamically consistent with a dramatic change of the observed emotion in the speech sample, the color shading in all the different parts of the emoticon symbol at once and implementing a speech emotion recognition model to enable converting observed emotions in speech samples to enrich text with visual emotion content in speech to text communications by: displaying the visual emotion content with text by a color mapping with emoticons; applying a threshold to compute duration of syllables of a phrase of words in the speech samples wherein each duration corresponds to a perceived excitement in the speech sample; implementing word stretching on a computed word duration and on a ratio of the computed word duration to syllables of phrases of the word in the speech sample to gauge intensity of words in the speech sample at a word level; and representing the perceived excitement in the speech samples by word stretching and by highlighting particular words.

The method further includes: highlighting or bolding the word in the phrase for the prominence based on the threshold duration for visual notice of the observed emotion. The method further includes stretching one or more letters in the word in the phrase for the prominence based on the threshold duration for visual notice of the observed emotion.

The method further includes computing the duration to syllable ratio based on a first, a second, and a third threshold, including a first syllable count corresponding to a first duration to symbol ratio greater than a first threshold; a second syllable count corresponding to a second duration to symbol ratio greater than a second threshold; and a third syllable count corresponding to a third duration to symbol ratio greater than a third threshold.

In another exemplary embodiment, a computer program product tangibly embodied in a computer-readable storage device and including instructions that when executed by a processor perform a method for speech emotion recognition for enriching speech to text communications between users in a speech chat session is provided. The method includes: implementing a speech emotion recognition model to enable converting observed emotions in a speech sample to enrich the text with visual emotion content in a speech to text communications by generating a data set of speech samples with labels of a plurality of emotion classes; extracting a set of acoustic features from each emotion class; generating a machine learning (ML) model based on at least one acoustic feature of the set of acoustic features and data set; training the ML model from acoustic features from speech samples during speech chat sessions; predicting emotion content based on a trained ML model in the observed speech; generating enriched text based on predicted emotion content of the trained ML model; and presenting the enriched text in a speech to text communications between users in the speech chat session for visual notice of an observed emotion in the speech sample.

The method further includes the enriching text in the speech to text communications by changing a color of a select set of the text of word in a phrase of a converted speech sample in the speech to text communications in the chat session for the visual notice of the observed emotion in the speech sample.

The method further includes the enriching text in the speech to text communications by including an emoticon symbol and shading with one or more colors different parts of the emoticon symbol in a speech to text communications of a converted speech sample in the speech to text communications in the chat session for the visual notice of the observed emotion in the speech sample by color shading in one or more of the different parts of the emoticon symbol.

The method further includes the changing dynamically consistent with a change of the observed emotion in the speech sample, the color shading in one or more of the different parts of the emoticon symbol wherein the change in color shading occurs gradually.

The method further includes the changing dynamically consistent with a dramatic change of the observed emotion in the speech sample, the color shading in all the different parts of the emoticon symbol at once. The method further includes the implementing a speech emotion recognition model to enable converting observed emotions in speech samples to enrich text with visual emotion content in speech to text communications by: implementing a speech emotion recognition model to enable converting observed emotions in speech samples to enrich text with visual emotion content in speech to text communications by: displaying the visual emotion content with text by a color mapping with emoticons; applying a threshold to compute duration of syllables of a phrase of words in the speech samples wherein each duration corresponds to a perceived excitement in the speech sample; implementing word stretching on a computed word duration and on a ratio of the computed word duration to syllables of phrases of the word in the speech sample to gauge intensity of words in the speech sample at a word level; representing the perceived excitement in the speech samples by word stretching and by highlighting particular words. The method further includes highlighting or bolding the word in the phrase for the prominence based on the threshold duration for visual notice of the observed emotion.

The method further includes the highlighting of the particular words by bolding the word in the phrase for the prominence for visual notice of the perceived excitement and stretching one or more letters in the word in the phrase for the prominence for visual notice of the observed emotion. The method further includes computing the duration to syllable ratio based on a first, a second, and a third threshold, including a first syllable count corresponding to a first duration to symbol ratio greater than a first threshold; a second syllable count corresponding to a second duration to symbol ratio greater than a second threshold; and a third syllable count corresponding to a third duration to symbol ratio greater than a third threshold.

In yet another embodiment, a system is provided and includes at least one processor; and at least one computer-readable storage device including instructions that when executed causes the performance of a method for processing speech samples for speech emotion recognition for enriching speech to text communications between users in speech chat. The system includes a speech emotion recognition model implemented by the processor to enable converting observed emotions in a speech sample to enrich the text with visual emotion content in a speech to text communications, wherein the processor is configured to generate a data set of speech samples with labels of a plurality of emotion classes; extract a set of acoustic features from each emotion class; select a machine learning (ML) model based on at least one of the set of acoustic features and data set; train the ML model from a particular acoustic feature from speech samples during speech chat sessions; predict emotion content based on a trained ML model in the observed speech; generate enriched text based on predicted emotion content of the trained ML model; and present the enriched text in a speech to text communications between users in the chat session for visual notice of an observed emotion in the speech sample.

The system further includes the processor further configured to: implement a speech emotion recognition model to enable converting observed emotions in speech samples to enrich the text with visual emotion content in a speech to text communications to display the visual emotion content with text by a color mapping with emoticons; apply a threshold to compute the duration of syllables of a phrase of words in the speech samples wherein each duration corresponds to a perceived excitement in the speech sample; implement word stretching on a computed word duration and on a ratio of the computed word duration to syllables of phrases of the word in the speech sample to gauge the intensity of words in the speech sample at a word level; and represent the perceived excitement in the speech samples by word stretching and by highlighting particular words.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
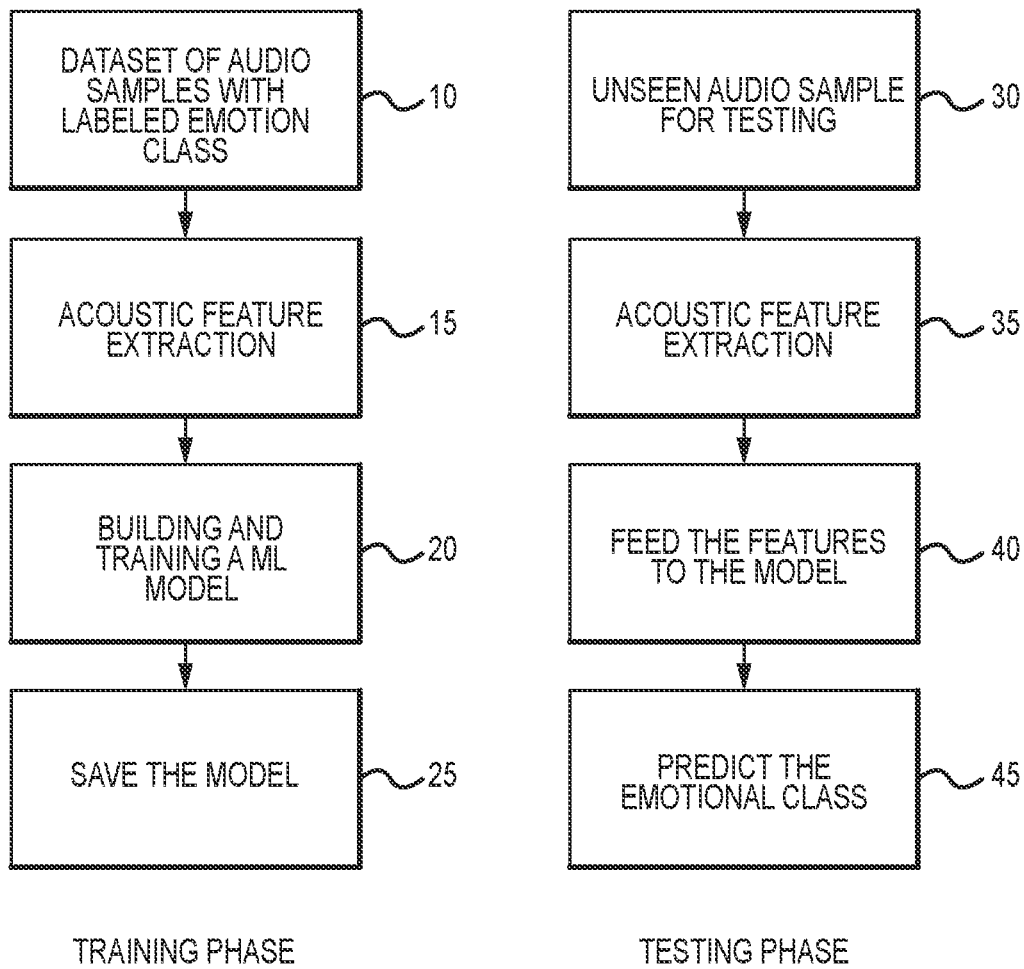
FIG. 1 illustrates an exemplary flowchart for implementing a machine learning training and predicting model for speech emotion recognition in the speech emotional recognition application in accordance in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Speech recognition is the process of converting a speech signal into a sequence of words. It is also referred to as Automatic Speech Recognition (ASR) or Speech-to-Text (STT). The use of speech recognition has become ubiquitous and is used in many aspects of daily life. For example, use may be found in automotive systems or environments in which users are busy with their hands, home automation (e.g., voice command recognition systems), speech-to-text processing (e.g., word processors or emails), and personal assistants on mobile phones (e.g., APPLE®'s SIRI® on iOS, MICROSOFT®'s CORTANA® on WINDOW®s Phone, GOGGLE® Now on ANDROID®).

Emotions color the language and act as a necessary ingredient for interaction between individuals. For example, one party in a conversation when listening to the other party reacts to the other party's emotional state and adapts their responses depending on what kind of emotions are sent and received. With the advent of text and other non-verbal communications, the emotional component is often lacking and therefore the recipient is unable to react or respond to different emotional states of the transmitting party. For example, in chat communications what is often received is the text without expressions of emotions. The recipient cannot determine at a given moment the sender of the text's emotional state leading to confusion, misinterpretation, etc. of chat text exchanges.

In various exemplary embodiments, the present disclosure provides systems and methods of presenting a rich text output by extracting key properties from voice samples and augmenting the text with additional features to visually illustrate emotional content with the text to the viewer.

Often is the case that when performing a speech-to-text conversion the tone and flavor (i.e. the human emotions in speech) in delivery of the text from the spoken speech are lost when converted. This is because speech to text is a clinical process that focuses on the exactness of the natural language processing of the speech. There has been little emphasis on focusing on the human emotion in the delivery of the speech and as a result part of the emotional text components are lost and this in return provides the user with an often-bland text presentation devoid of human emotional content.

In the various exemplary embodiment, the present disclosure describes systems and methods implementing a speech emotion recognition application that re-create emotions present in speech samples by visual representations or changes of the text from the speech sample to generate enriched text output.

In various exemplary embodiments, the present disclosure describes systems and methods that implement a speech emotion recognition application in voice chat applications for capturing emotions in speech samples that are converted into text and communicated via chat applications.

In various exemplary embodiments, the present disclosure describes systems and methods that implement a speech emotion recognition application with speech Emotion recognition features, text and word stretching detection and stretching, text and word prominence detection, and presentations.

It is generally thought that human voice signals and their features have a very good correlation with the emotional status of a person. The mood of a person can be figured out by observing the tone of his speech. The present disclosure provides a speech emotion recognition application that implements a machine learning (ML) solution to train the model for a large labeled dataset of speech samples with an emotional category as the label (e.g. angry, sad, happy, neutral, fear, etc.). The speech emotion recognition application employs a two-step process of training a model by implementing the ML solution to create a training set that contains emotion features extracted from speech samples that creates a training model of an emotion dataset and classifying labels of various emotional classes to classify the data set. In addition, the speech emotion recognition application also employs a rule-based process for enriching the text with emotion content.

FIG. 1 illustrates an exemplary flowchart for implementing a machine learning training and predicting model for speech emotion recognition in accordance with an embodiment. In FIG. 1, at step 10, a dataset of audio samples with labeled emotion class is created by a speech emotion recognition application. The data set is representative of the text domain to infer various emotions from speech using machine learning techniques to obtain meaningful results.

Various solutions have been developed for data sets of emotions in a speech that can include the following: (1). The Ryerson Audio-Visual Database of Emotional Speech and Song (RAVDESS): This database contains 24 professional actors (12 male, 12 female), speaking two sentences in American English accent in 8 different emotions which are calm, happy, sad, angry, fearful, surprise, disgust and neutral. All the audio samples are 48 kHz sampled and the bit depth is 16 bit. The actors are asked to speak in two intensities for each sentence and emotion; (2). Surrey Audio-Visual Expressed Emotion (SAVEE): This database was recorded for the development of an automatic speech emotion recognition system. The database has 4 male actors speaking some English sentences in 7 different emotions like angry, disgust, happy, fear, sad, surprise, and neutral. The database has a total of 480 utterances. The data were recorded in a visual media lab with high-quality equipment and they were labeled; (3). The Toronto Emotional Speech Set (TESS): the database consists of two female actors of ages 26 and 64 speaking some sentences with the format 'Say the word _____' and there were 2000 target words filled in the sentence. The actresses were recruited from the Toronto area and both of them speak English as their first language. The actresses were asked to speak the sentences in 7 emotions which are anger, disgust, fear, happiness, pleasant surprise, sadness, and neutrality. There is a total of 2800 audio samples; (4.) The Berlin Database of Emotional speech (Emo-DB): This database includes a set of actors both male and female speaking some sentences in the Berlin language. The actors speak in emotional classes such as happy, angry, anxious, fearful, bored, disgusted, and neutral. There are more than 10 actors and 500 utterances per actor; (5.) The MELD (Multimodal Emotion Lines Dataset): the MELD has more than 1400 dialogues and 13000 utterances from Friends TV series. Multiple speakers participated in the dialogues. Each utterance in dialogue has been labeled by any of these seven emotions—Anger, Disgust, Sadness, Joy, Neutral, Surprise, and Fear. The disadvantage with this dataset is the background music and the background laughter sounds.

The speech emotion recognition application includes feature extraction and features classification phase. At step 15, a set of features are extracted from speech samples or audio samples. For example, PCM audio packets generated from a mobile device in communication with a set-top box may send PCM audio samples to a voice server that hosts the speech emotion recognition application to perform acoustic feature extraction. One type of classification is a short-term classification based on short-period characteristics such as energy, formants, and pitch. The acoustic feature extraction as step 15 can include extracting a set of Mel-Frequency Cepstrum Coefficients (MFCC) coefficients for classification.

That is, in an exemplary embodiment, a set of MFCC coefficients of 13 MFCC coefficients are extracted and a first and second order derivative is derived for each of the MFCC coefficients resulting in classifying 39 features (13MFCC+ 13 DEL+13 DEL DEL) (i.e. statistics like mean, median, variance, maximum and minimum are calculated). This results in a total of about 195 Feature combinations. The building and training of the machine learning (ML) model involve first, for the building stage: creating multiple formants where, as an example, a set (i.e. a set of parameters) of the first five formant frequencies and formant bandwidths are extracted. From these first five formant frequencies and bandwidths, approximately 10 features derivatives are calculated which results in making about 20 features. For each of these 20 features, additional sub-features can be derived that include statistics such as mean, median, variance, maximum and minimum calculations. This, in turn, results in a set of about 100 features in total.

For example, for a pitch feature, a set of statistic features for pitch and derivative features can be extracted that result in a total of a set of 10 pitch features. Likewise, for a zero-crossing rate feature (ZCR), a set of feature statistics for ZCR and derivatives of the ZCR feature are extracted resulting in a total ZCR feature set of about 10 features. The same applicable number of features can be derived for other features such as for RMS energy features, for Voiced and Unvoiced energy Fundamental frequency: Statistics and its derivative are extracted. 10 features, Intensity: 10 features Spectral flux: 10 features Spectral bandwidth: 10 features Spectral centroid: 10 features Spectral contrast: 10 features Spectral flatness: 10 features Spectral roll-off: 10 features Also, the speaking rate: the reciprocal of the average length of the voiced part of the utterance includes 1 feature, the Jitter: the shimmer includes 1 feature, the Shimmer includes 2 features (shimmer and shimmer in dB), and the harmonic to noise ratio includes 1 feature.

Combining all these features results in a total of about 430 features. Though it should be noted that not every feature was used in each model generated, and further, the features for each model are selected based on importance to the model, particularly in the case with models that are generated with a varying number of features.

The speech emotion recognition application, in an exemplary embodiment, may be implemented in python using python libraries that include a sound file to read a received .wav file with speech, a parsing library such as parselmouth: to extract features like formants, intensity, jitter, shimmer, shimmer in dB, harmonic to noise ratio, a feature extraction library file like librosa: to extract features like ZCR, MFCC, RMS energy, spectral centroid, spectral bandwidth, spectral flatness, spectral roll-off, and spectral contrast; a pitch extraction library file called pysptk to extract features like pitch, fundamental frequency; a flux extraction python file called pyAudioAnalysis to extract spectral flux.

Various machine learning techniques may be implemented by the speech emotion recognition application to recognize emotions and can include techniques such as adaBoostClassifier, a decision tree, an extra trees classifier for classification and feature importance, a logistic regression, a neural network, a random forest, a support vector machine, and XGBoost Classifier. Also, Deep learning techniques such as Deep Boltzmann Machine (DBM), Recurrent Neural Network (RNN), Recursive Neural Network (RNN), Deep Belief Network (DBN), Convolutional Neural Networks (CNN), and Auto Encoder (AE) for speech emotion recognition.

The following is a list of derived models for classifying features in the speech-to-text emotion recognition model. The decision_tree_1 is a decision tree model with maximum depth 8 which is trained on TESS, BERLIN, RAVDESS, and SAVEE datasets on all features.

| 1 print (cm) |
|---|
| [[203 29 6 3] |
| [32 153 29 8] |
| [13 21 167 12] |
| [3 6 33 156]] |

| 1 print (classification_report(y_test, dtree_predictions)) | | | | |
|---|---|---|---|---|
| | precision | recall | f1-score | support |
| 0 | 0.81 | 0.84 | 0.83 | 241 |
| 1 | 0.73 | 0.69 | 0.71 | 222 |
| 2 | 0.71 | 0.78 | 0.75 | 213 |
| 3 | 0.87 | 0.79 | 0.83 | 198 |
| micro avg | 0.78 | 0.78 | 0.78 | 874 |
| macro avg | 0.78 | 0.78 | 0.78 | 874 |
| weighted avg | 0.78 | 0.78 | 0.78 | 874 |

The classifying output or report of decision_tree_1 model based on validation data includes micro, macro, and weighted averages of about 0.78 for classifying the emotional content of the text.

The decision_tree_1_depth_13: The decision tree model with maximum depth 13 which is trained on TESS, BERLIN, RAVDESS, and SAVEE datasets on all features.

| 1 print (cm) |
|---|
| [[194 37 4 6] |
| [25 161 21 15] |
| [10 16 174 13] |
| [6 6 13 173]] |

| 1 print (classification_report(y_test, dtree_predictions)) | | | | |
|---|---|---|---|---|
| | precision | recall | f1-score | support |
| 0 | 0.83 | 0.80 | 0.82 | 241 |
| 1 | 0.73 | 0.73 | 0.73 | 222 |
| 2 | 0.82 | 0.82 | 0.82 | 213 |
| 3 | 0.84 | 0.87 | 0.85 | 198 |
| micro avg | 0.80 | 0.80 | 0.80 | 874 |
| macro avg | 0.80 | 0.81 | 0.80 | 874 |
| weighted avg | 0.80 | 0.80 | 0.80 | 874 |

The classification report of decision_tree_1_depth_13 based on the validation data has a micro, macro, and weight average of 0.8 for classifying the speech emotion features recognized.

The decision_tree_1_depth_8_features_10 has a maximum depth of 8 which is trained on TESS, BERLIN, RAVDESS, and SAVVE dataset on the top 10 features given by the feature indices of extra trees classifier.

| [[205 18 13 5] |
|---|
| [49 145 25 3] |
| [21 13 170 9] |
| [14 6 45 133]] |

| | precision | recall | f1-score | support |
|---|---|---|---|---|
| 0 | 0.71 | 0.85 | 0.77 | 241 |
| 1 | 0.80 | 0.65 | 0.72 | 222 |
| 2 | 0.67 | 0.80 | 0.73 | 213 |
| 3 | 0.89 | 0.67 | 0.76 | 198 |
| micro avg | 0.75 | 0.75 | 0.75 | 874 |
| macro avg | 0.77 | 0.74 | 0.75 | 874 |
| weighted avg | 0.76 | 0.75 | 0.75 | 874 |

A Classification report of decision_tree_1_depth_8_features_10 on validation data has a micro, macro, and weight average of 0.75, 0.77, and 0.76 respectively for classifying the speech emotion features recognized.

The decision_tree_2_depth_5 with maximum depth 5 which is trained on BERLIN, SAVEE, and TESS on all features.

| 1 print (confusion_matrix(y_test,dtree_prediction)) |
|---|
| 2 print (classification_report(y_test,dtree_predictions)) |
| [[144 11 3 13] |
| [21 128 4 7] |
| [8 1 102 23] |
| [5 1 9 382]] |

| | precision | recall | f1-score | support |
|---|---|---|---|---|
| 0 | 0.81 | 0.84 | 0.83 | 171 |
| 1 | 0.91 | 0.80 | 0.85 | 160 |
| 2 | 0.86 | 0.76 | 0.81 | 134 |
| 3 | 0.90 | 0.96 | 0.93 | 397 |
| micro avg | 0.88 | 0.88 | 0.88 | 862 |
| macro avg | 0.87 | 0.84 | 0.85 | 862 |
| weighted avg | 0.88 | 0.88 | 0.88 | 862 |

Classification report of decision_tree_2_depth_5 on validation data has a micro, macro, and weight average of 0.88, 0.87, and 0.88 respectively for classifying all the speech emotion features recognized.

The decision_tree_2_depth_8 is a decision tree model with maximum depth 8 which is trained on BERLIN, SAVEE, and TESS on all features.

| 1 print (confusion_matrix(y_test,dtree_prediction)) |
|---|
| 2 print (classification_report(y_test,dtree_predictions)) |
| [[147 14 1 9] |
| [19 131 3 7] |
| [4 1 112 17] |
| [3 1 4 389]] |

| | precision | recall | f1-score | support |
|---|---|---|---|---|
| 0 | 0.85 | 0.86 | 0.85 | 171 |
| 1 | 0.89 | 0.82 | 0.85 | 160 |
| 2 | 0.93 | 0.84 | 0.88 | 134 |
| 3 | 0.92 | 0.98 | 0.95 | 397 |
| micro avg | 0.90 | 0.90 | 0.90 | 862 |
| macro avg | 0.90 | 0.87 | 0.88 | 862 |
| weighted avg | 0.90 | 0.90 | 0.90 | 862 |

The classification report of decision_tree_2_depth_8 on validation data has a micro, macro, and weight average of 0.90 for classifying all the speech emotion features recognized.

The decision_tree_3_depth_8_normalised is a decision tree model with maximum depth 8 which is trained on BERLIN, SAVEE, and RAVDESS on all features with normalization. The scaler is fit to the training data and is saved as a .pickle file: 'decision_tree_3_depth_8_normaliser_scaler.pickle'.

```
1 print (confusion_matrix(y_test,dtree_prediction))
2 print (classification_report(y_test,dtree_predictions))
```

[[189 21 7 4]
[43 163 14 8]
[12 13 137 27]
[5 11 12 398]]

|  | precision | recall | f1-score | support |
|---|---|---|---|---|
| 0 | 0.76 | 0.86 | 0.80 | 221 |
| 1 | 0.78 | 0.71 | 0.75 | 228 |
| 2 | 0.81 | 0.72 | 0.76 | 189 |
| 3 | 0.91 | 0.93 | 0.92 | 426 |
| micro avg | 0.83 | 0.83 | 0.83 | 1064 |
| macro avg | 0.81 | 0.81 | 0.81 | 1064 |
| weighted avg | 0.83 | 0.83 | 0.83 | 1064 |

A Classification report of decision_tree_3_depth_8_normalised on validation data has a micro, macro, and weight average of 0.83, 0.81, and 0.83 respectively for classifying all the speech emotion features recognized.

The extra_tree_1_features_25 is an extra tree classifier with a number of estimators=250 which is trained on TESS, SAVEE, BERLIN, and RAVDESS dataset on the top 25 features given by the feature indices of extra trees classifier.

```
1 yPred = (forest.predict(X_test))
2 print (confusion_matrix(y_test,dtree_prediction))
3 print (classification_report(y_test,dtree_predictions))
```

[[236 17 5 4]
[21 192 11 6]
[2 7 209 10]
[0 5 12 224]]

|  | precision | recall | f1-score | support |
|---|---|---|---|---|
| 0 | 0.91 | 0.90 | 0.91 | 262 |
| 1 | 0.87 | 0.83 | 0.85 | 230 |
| 2 | 0.88 | 0.92 | 0.90 | 228 |
| 3 | 0.92 | 0.93 | 0.92 | 241 |
| micro avg | 0.90 | 0.90 | 0.90 | 961 |
| macro avg | 0.89 | 0.90 | 0.90 | 961 |
| weighted avg | 0.90 | 0.90 | 0.90 | 961 |

The classification report of extra_tree_1_features_25 on validation data has a micro, macro, and weight average of 0.90, 0.89, and 0.90 respectively for classifying all the speech emotion features recognized.

The random_forest_1_noEstimators_100_features_20 is a random forest model with the number of estimators=100 which is trained on TESS, SAVEE, BERLIN, and RAVDESS on top 20 features given by the feature indices of extra trees classifier.

```
1 yPred = (forest.predict(x_test))
2 print ("confusion_matrix:")
3 print (confusion_matrix(y_test, y_pred))
4 print ("Classification_Report")
5 print (classification_report(y_test, y_pred))
```

Confusion matrix:
[[192 9 2 3]
[23 140 6 3]
[3 3 151 5]
[0 1 14 173]]

Classification Report

|  | precision | recall | f1-score | support |
|---|---|---|---|---|
| 0 | 0.88 | 0.93 | 0.91 | 206 |
| 1 | 0.92 | 0.81 | 0.86 | 172 |
| 2 | 0.87 | 0.93 | 0.90 | 162 |
| 3 | 0.94 | 0.92 | 0.93 | 188 |
| micro avg | 0.90 | 0.90 | 0.90 | 728 |
| macro avg | 0.90 | 0.90 | 0.90 | 728 |
| weighted avg | 0.90 | 0.90 | 0.90 | 728 |

The Classification report of random_forest_1_noEstimators_100_features_20 on validation data has a micro, macro, and weight average of 0.90 for classifying all the speech emotion features recognized.

Figure 2:
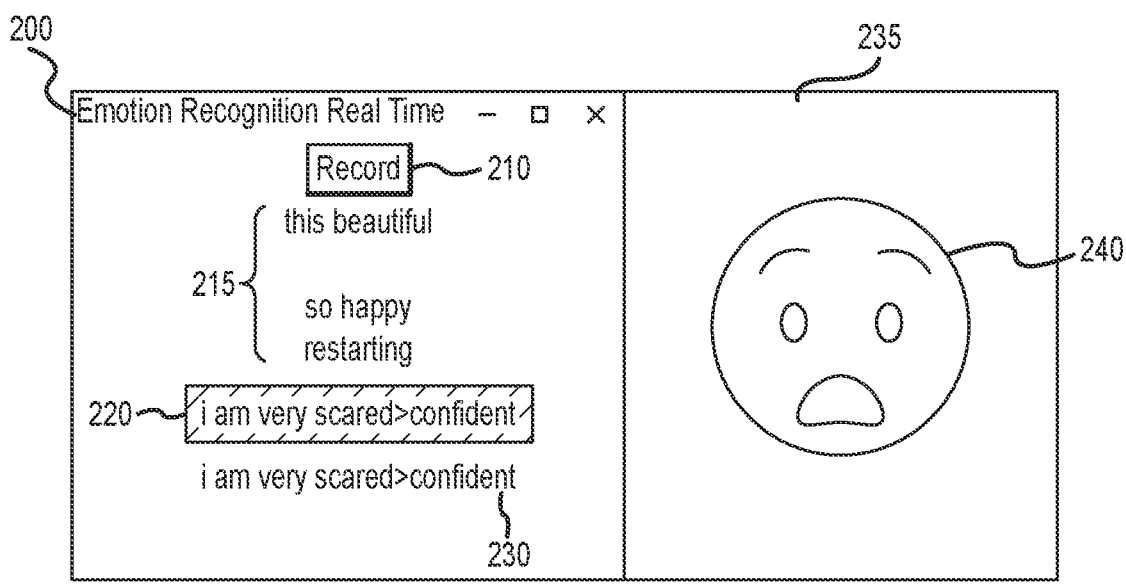
FIG. 2 illustrates an exemplary diagram of visual presentations of emotion content in a speech to text communications in accordance with the exemplary embodiments described herein.

An exemplary embodiment of a rules-based model based on the results of the various saved models has the following rules for implementing the speech emotion recognition application. The rules include a calculation of the count (i.e. an "angry," "happy," "neutral," "sad" count) of individual emotion classes among the above 8 models. If the angry count is greater than or equal to all other emotion counts then it is declared angry else if there is any happy output in decision_tree_1, decision_tree_1_depth_13, or decision_tree_2_depth_5 then it is declared happy; Else if the neutral count is greater than or equal to all other emotion counts then it is declared neutral; Else if there is any sad output in decision_tree_1, decision_tree_1_depth_13 or decision_tree_2_depth_5 then it is declared sad; and if none of the other rules are satisfied then it is declared as neutral FIG. 2, illustrates an exemplary diagram of the presentation of an emoticon and emotion text in accordance with an embodiment. In FIG. 2, the emotion status of a user is identified by various algorithmic solutions of the emotion speech recognition application. For example, in FIG. 2, the emotion speech recognition is performed in real-time and displayed in a graphic user interface (GUI) 200 created using PYTHON® code but can also be rendered in HTML (i.e. in an HTML page by actuation) with a record button 210 in the graphic user interface 200. The speech recorded is transposed into text 210 with various colors to represent an expression corresponding to the text. For example, the text "so happy" can be generated in a different color such as "red" (note text is not shown in color in FIG. 2) to signify happiness. The text such as "I am very scared>confident" can be represented in block 220 with various attributes such as the block 220 shaded in black and the text displayed in a different color such as yellow to stand out more and to represent confidence and correspond to the text phrase displayed below of "I am very confident:>confident" 230. As the emotion of the user changes, in-text 230 to "I am very scared>confident", text 230 is displayed in the color "blue" to show the change from being very confident to being scared. In this manner, the change of state of emotions is exhibited in real-time. The analogy expressed is that emotions associated with a user are not static but dynamic and constantly changing. One moment, a user is confident, and the next moment the user is less than confident. Further, in FIG. 2, on the display page 235, an emoticon 240 is presented that in real-time changes from color in an upper part of shades of bluish color to a lower part of shades of green, yellow, and orange. The emoticon 240 mimic dynamic emotion changes that are occurring in the speech of the user as determined by voice emotion analysis solutions of the speech emotion recognition application. In other words, the output of the speech emotion recognition is configured in a manner to be presented in different color shades of in the emoticon 240 that is displayed. As the emotions change, the emoticon 240 changes colors or shades in color to correspond to detected changes in the user's emotion as determined by the emotion speech recognition application.

In an exemplary embodiment, if a user is very happy, the emoticon 240 may be represented in its entirety in the color of red. As the user's speech detected emotions change, for example, the user becomes more confident, the emoticon 240 may be configured to turn more blackish dynamically. The change in color may occur immediately or suddenly with demarked or immediate color changes; or maybe a gradual change in color over a period of time.

Figure 3:
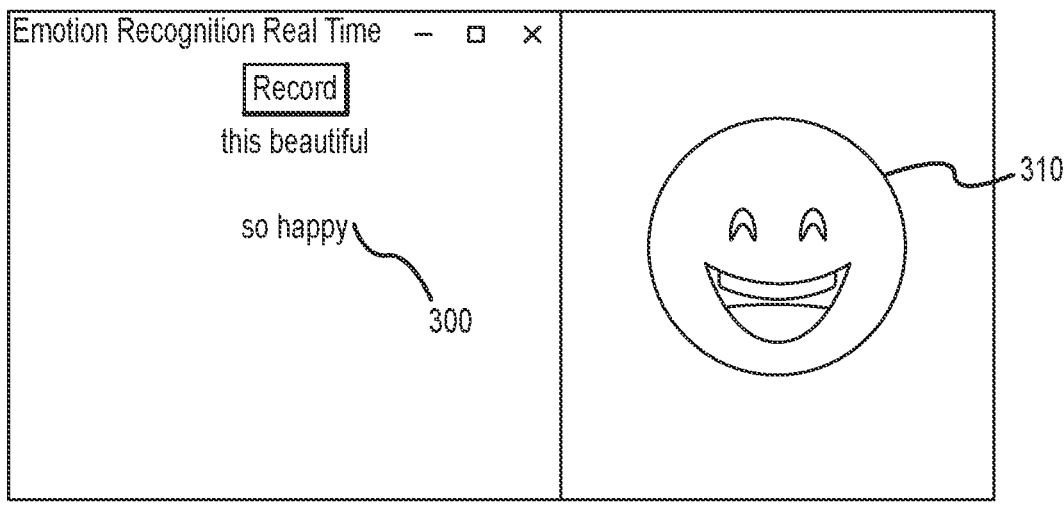
FIG. 3 illustrates an exemplary diagram of visual presentations of emotion content in a speech to text communications in accordance with the exemplary embodiments described herein.

FIG. 3 illustrates another exemplary diagram of the presentation of an emoticon and emotion text in accordance with an embodiment. In FIG. 3, for a text of "so happy" 300, the emoticon 310 is presented with a very happy smile. In other words, the emoticon 310 is selected based on the emotion analysis by the speech emotion recognition application which selected an emoticon 310 that is the best fit or best correspondence to the emotion recognized in the observed voice. In various exemplary embodiments, a table or emoticons with different expressions may be stored locally and accessible by the speech emotion recognition application for presenting with or in place of recognized emotions in speech. Further, other like emoticons such as GIFs or JPEG images may also be used to convey a presentation of emotions in a display to the user of the recognized emotions.

Figure 4:
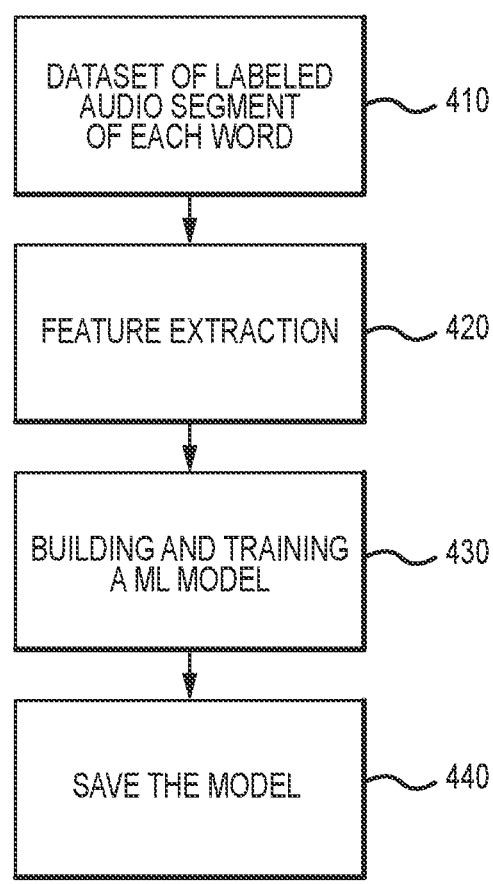
FIG. 4 illustrates an exemplary flowchart of a process of constructing a machine learning (ML) model for word stretching for visual presentations of emotion content in a speech to text communications in accordance with the exemplary embodiments described herein.

FIG. 4 is an exemplary flowchart for building an ML model for word stretching to show emotion such as excitement by the emotion speech recognition application in accordance with an embodiment. In FIG. 4, at step 410 is a dataset of the labeled audio segment of each word, at step 420 feature extraction, at step 430 building and training an ML model, and at step 440 the model is saved. The threshold-based approach is found to be more accurate than the machine learning approach. The threshold-based approach considers the ratio of the duration of each word to the number of syllables in it, the higher this ratio is the more the chances of it becoming stretched. The thresholds for this feature were categorized into three classes of words. Single syllable words: Threshold=0.57. Two syllable words: Threshold=0.41. Three syllable words: Threshold=0.32

Figure 5:
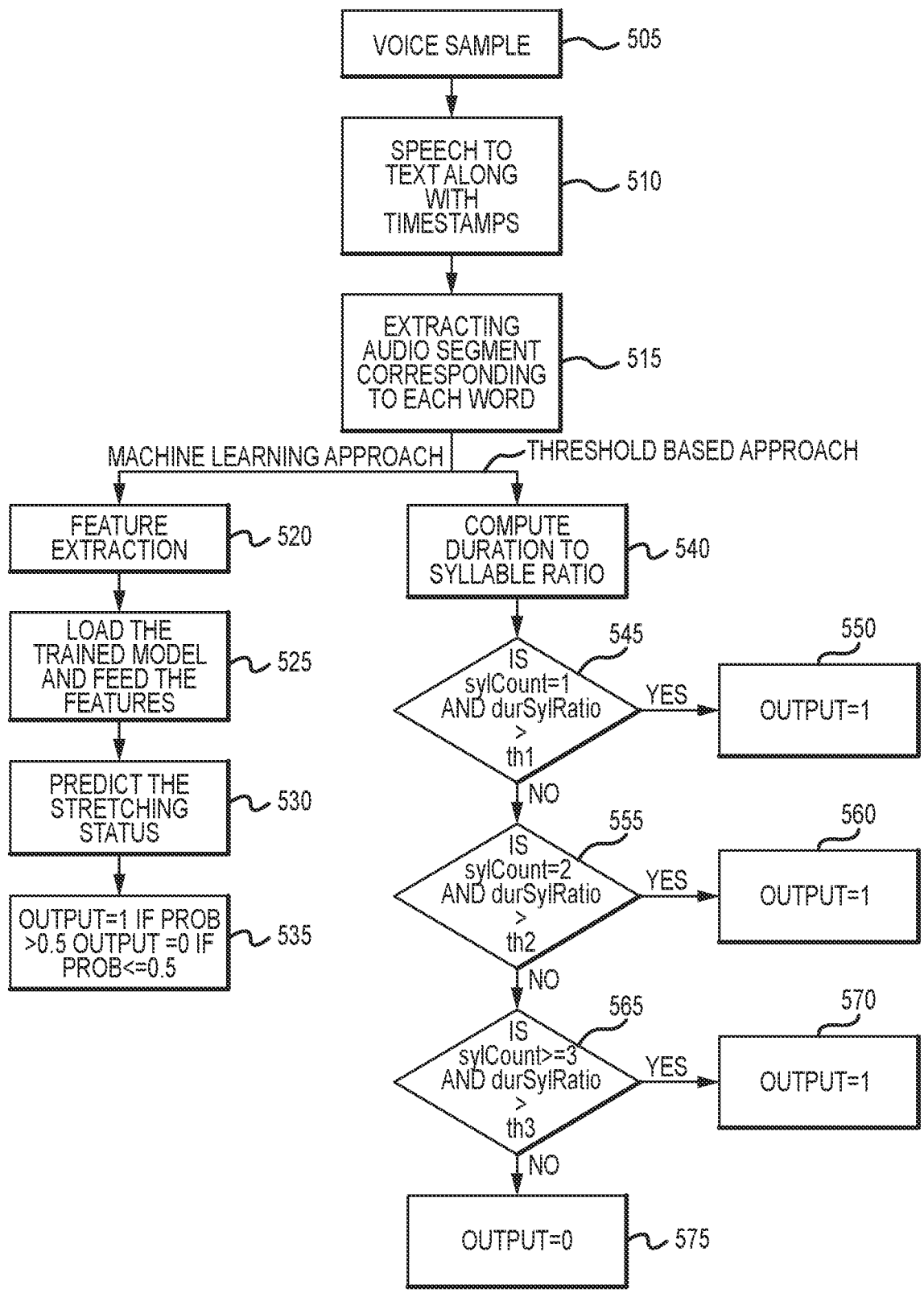
FIG. 5 illustrates an exemplary flowchart of identifying the process to determine whether the word stretching is required for visual presentations of emotion content in a speech to text communications in accordance with the exemplary embodiments described herein.

FIG. 5 is a flowchart for word stretching detection for a speech emotion recognition application in accordance with an embodiment. At step 505, voice samples are received. At step 510, speech is converted to text and timestamped at the time of conversion. At step 515, extracting audio segment corresponding to each word; After which the flow is divided into either the machine learning process or the threshold-based approach. In the machine learning approach, at step 520, the feature extraction is executed. At step 525, the trained model is loaded and fed the features for processing. At step 530, a process of predicting the stretching status for each of the words loaded. At step 535, the output is equal to 1 if the probability is greater or equal to 0.5, or the output is equal to zero if the probability is less than or equal to 0.5 to determine which words, vowels, etc. to be stretched. The threshold-based approach, at step 540, is to compute the duration to syllable ratio to apply a threshold and includes computing the duration of syllables of a phrase of words in the speech samples with each duration corresponding to a perceived excitement in the speech sample.

At step 545, if the sylcount is equal to 1 and the dursyratio greater than threshold1 then the output is at step 550 is 1. In general syllable count is a unique number (ex: 1, 2, 3) dursylratio is expressed in terms of threshold1, threshold2, etc. . . . . . At step 555, if the sylcount is equal to 2 and the dursyratio greater than threshold 2 then the output is at step 560 is 1. At step 565, if the sylcount is equal to 3 or greater and the dursyratio greater than threshold 3 then the output is at step 570 is 1. If no, then at step 575 the output is equal to 0. Once the identification of which word to stretch is done, the next step is to implement that stretching. That includes the identification of which vowel exactly in the word was stretched. Hence, by implementing word stretching on a computed word duration and a ratio of the computed word duration to syllables of phrases of the word in the speech sample, this enables the intensity of each word to be gauged in the speech sample at a word level so the perceived excitement in the speech samples can be represented by word stretching and by highlighting particular words.

Figure 6:
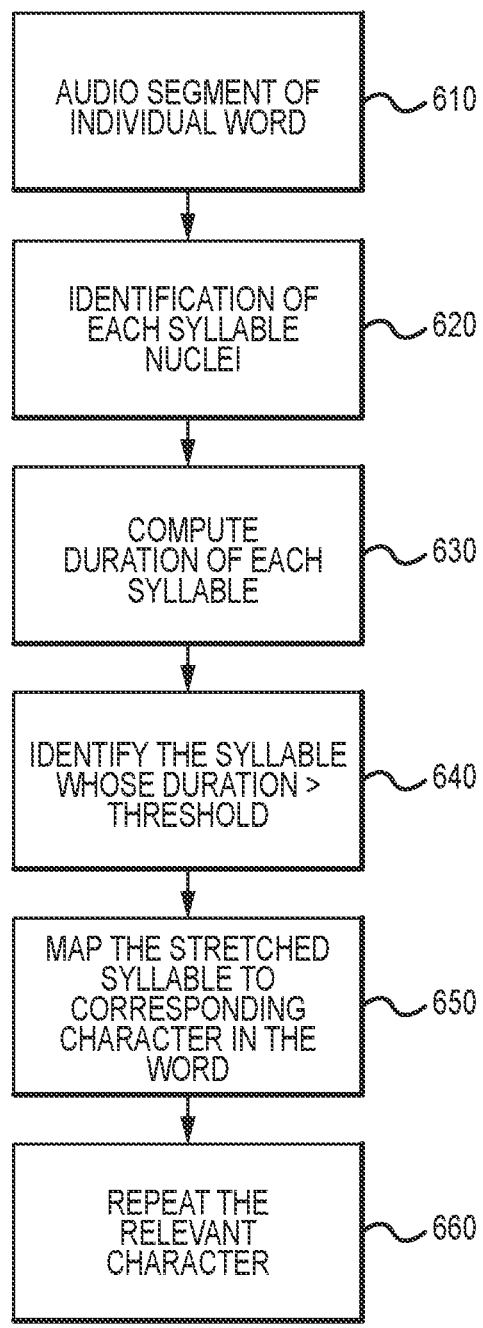
FIG. 6 illustrates an exemplary flowchart for a process to identify which vowel sounds or characters to be stretched in the word for visual presentations of emotion content in a speech to text communications in accordance with the exemplary embodiments described herein.

FIG. 6 is a flowchart for implementing word stretching for the speech emotion recognition application in accordance with an embodiment. In FIG. 6, at step 610, the audio segment of the individual word is received by the speech emotion recognition application. At step 620, the identification of each syllable nuclei is performed and at step 630, the speech emotion recognition application computes the duration of each syllable. Step 640, identifies the syllable whose duration is greater than the threshold. At step 650, the stretched syllable is mapped to the corresponding character in the word. At step 660, each of the relevant characters is repeated to create the stretched syllable of characters in the word.

In order to implement the stretching process of characters in each word, a set of rules is created. The set of rules is designed for stretching in words based in English on the number of vowels and syllables. Though the implementation is for English language implementations, it is contemplated that a variety of other languages may also be amenable to the stretching process with or without minor modifications of the described stretching process. In other words, the English language-based description of stretching characters in words is not limited to just English words.

Figure 7:
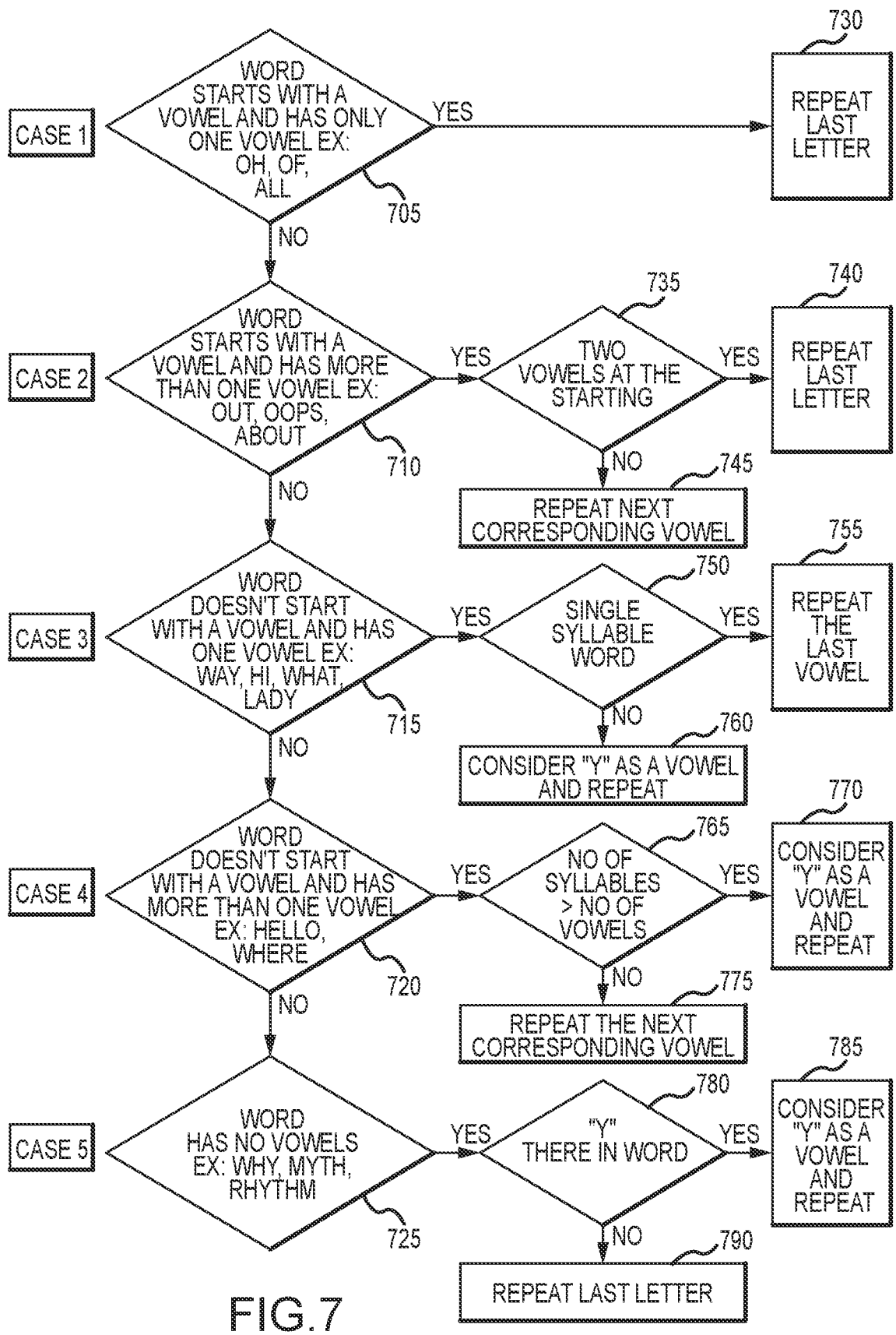
FIG. 7 illustrates an exemplary flowchart of word stretching in the English language based on the number of vowels and syllables for visual presentations of emotion content in a speech to text communications in accordance with the exemplary embodiments described herein.

FIG. 7 is a flowchart of stretching words with vowels by the speech emotion recognition application in accordance with an embodiment. As indicated, there are a plethora of rules that are necessitated in the stretching process, one such basic rule for word stretching is that single character words are left unchanged. FIG. 7 illustrates each of the rules which depend on the number of vowels and the number of syllables in the word and can range from a set of 1 to 5. The rules can be described as follows: Case 1: at 705, words starting with a vowel and have only one vowel. For this type of word 730, the last character should be repeated; For example: oh->ohhh, and at->attt; Case 2: at 710, words starting with a vowel and have more than one vowel. For this type of word, there are two subcases as follows: Case 2a) at 735 if the word has two vowels at the starting then at 745 repeats the next corresponding vowel, else at 740 repeats the last character. For example: out->outtt, ouch->ouchhh, and Case 2b) Else: at 745 repeats the corresponding vowel. For example: about->abooout, again->agaaain. In Case 3: at 715, words not starting with a vowel and has only one vowel: For this type of word, there are two subcases. Case 3a) at 750 if the word is single syllable: Repeat at 755, the corresponding vowel. For example: way->waaay, hi->hiii. Case 3b) If the word has more than one syllable: at 760, consider 'y' also as a vowel and repeat the corresponding vowel. For example: lady->ladyyy, happy->happyyy.

Case 4: at 720, words that don't start with a vowel and have more than one vowel: Repeat at 775 the corresponding vowel. For example: hello->heeello, where->wheeere, but at

770 if numbers of syllables are more than number of vowels then consider 'y' also as a vowel and repeat the corresponding vowel. For example: agony->agonyyy. Case 5: at 725, words with no vowels: These types of words have two subcases, Case 5a) at 780, if 'y' is there in the word: at 785, Consider 'y' as a vowel and repeat the vowel. For example, my->myyy and Case 5b) at 790, if 'y' is not there in the word: then repeat the last letter.

Figure 8:
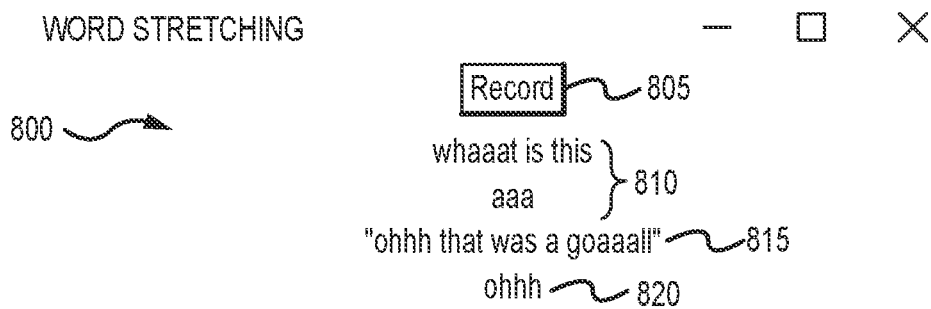
FIG. 8 illustrates an exemplary diagram of word stretching with vowels for visual presentations of emotion content in a speech to text communications in accordance with the exemplary embodiments described herein.

FIG. 8 is a diagram that illustrates the presentation of the results of word stretching by the speech emotion recognition application in accordance with an embodiment. The output of the word stretching is illustrated in FIG. 8 whereupon actuating the record button 805 of the GUI 800, the vowels "aaa" in the phrase "whaaat is this" 810 are stretched (i.e. the corresponding vowel repeated), in the phrase "Ohhh that was a goaaall" 815, the word "ohhh" 820 last "h" is considered a vowel sound and repeated.

Figure 9:
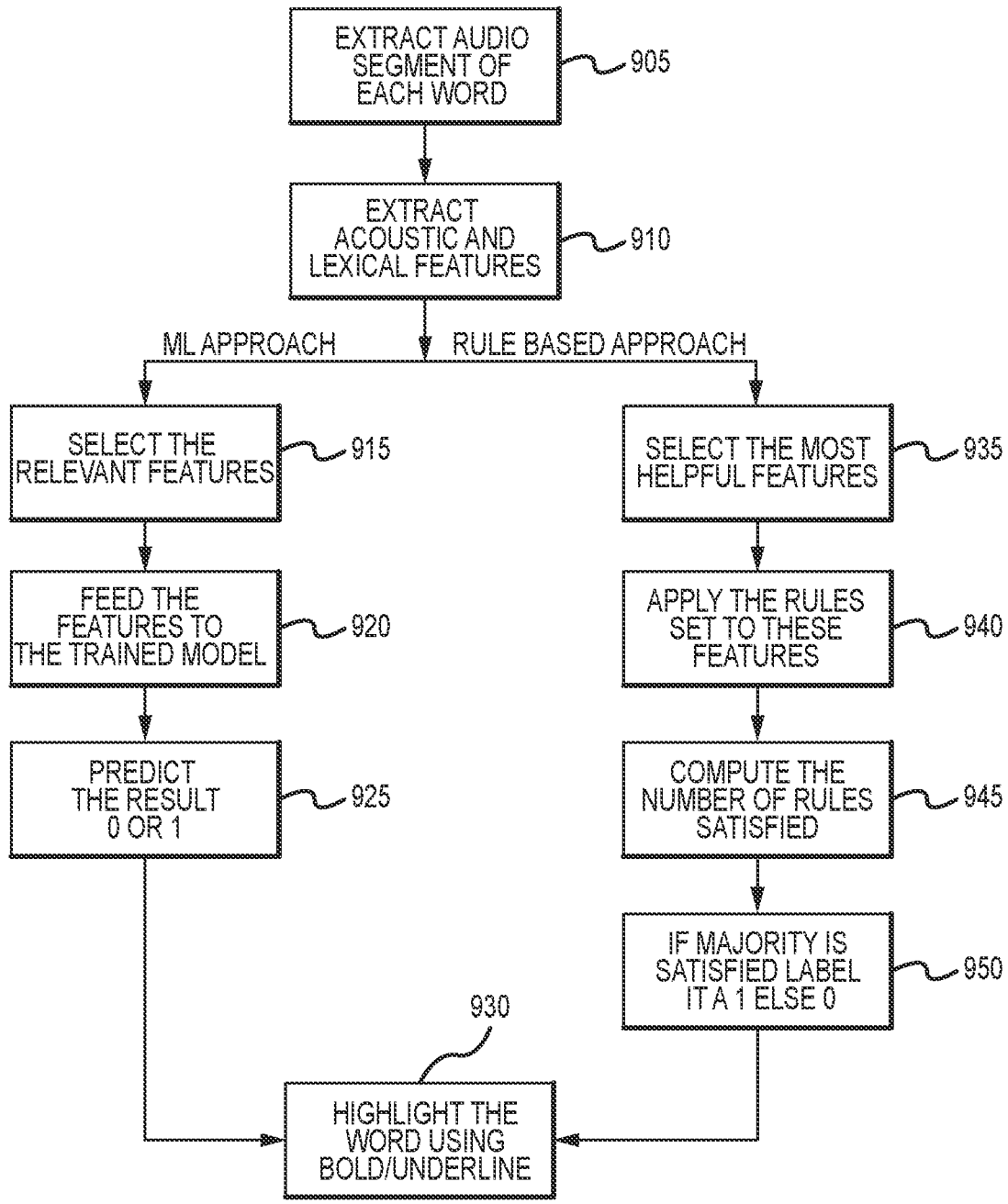
FIG. 9 illustrates an exemplary diagram of the detection of prominent words for visual presentations of emotion content in a speech to text communications in accordance with the exemplary embodiments described herein.

FIG. 9 is a flowchart of the detection of prominent words by the speech emotion recognition application in accordance with an embodiment. The flowchart in FIG. 9 illustrates word prominence detection and highlighting. The detection of prominent words in the conversation can add more meaning and give a little more clarity. For example, the phrase 'I never said she stole my money' is a 7-word sentence that can get 7 different meanings when each individual word is stressed. The following are examples of bolded stressed letters and words in the phrase that can convey different meanings by viewing the phrases:

I never said she stole my money: Means someone else accused her not the speaker I never said she stole my money: Means the speaker never said that I never said she stole my money: He didn't accuse her by saying I never said she stole my money: He didn't accuse that girl I never said she stole my money: She didn't steal it, she may have borrowed I never said she stole my money: She didn't steal the speaker's money but maybe someone else's.

I never said she stole my money: She didn't steal the money, but she stole something else.

If the machine learning approach and rules-based approach were attempted, but ML but because of outside factors, deemed not to be applicable to all chat services. In other words, a more general methodology of word prominence can appeal to a wider class of chat applications that fall outside the training set. In this case, as each speaker has his own energy level and pace while talking, the detection of word prominence is easily implemented in a rule-based approach.

The rules can be described as follows for implementing the word prominence features: for i in range (no of Words in the sentence):

1. MeanIntensity[i]>3*(mean of all the words' meanIntensity)
2. MeanDerIntensity[i]>3*(mean of all the words' meanDerintensity)
3. varianceIntensity[i]>2*(mean of all the words' varianceIntensity)
4. varianceDerIntensity[i]>0.9*(mean of all the words' varianceDerintensity)
5. DurationSyllableRatio[i]>mean of all the words' durationSyllableRatio
6. meanRMS[i]>mean of all the words' meanRMS
7. maxRMS[i]>mean of all the words' maxRMS
8. wordType[i]==1 (which means the word should be a content word)

The pseudo code for word prominent detection is:
function detect ProminentWords ( )//identify the stressed words from the user sentence using the word level features{array wordProminenceStatus [numWords]={0, 0, . . . }//set all words as not prominent initially int numOfRulesSatisfied;
//variable for holding the number of rules satisfied out of 8 rules for (i=0; i<numWords; i++)
//looping over all the words of the sentence{numOfRulesSatisfied=0//reset the value for every iteration
//Checking for Rule 1: Checking whether the meanIntensity of the current word is greater than 3 times the average meanIntensity of all the words in the sentence
if(meanIntensity[i]>3*(mean of all the words' meanIntensity))   numOfRulesSatisfied=numOfRulesSatisfied+1//increment by 1
//Checking for Rule 2: Checking whether the meanDerIntensity of the current word is greater than 3 times the average meanDerIntensity of all the words in the sentence if(meanDerIntensity[i]>3*(mean of all the words' meanDerIntensity))//meanDerIntensity means mean of intensity derivativesnumOfRulesSatisfied=numOfRulesSatisfied+1//increment by 1
//Checking for Rule 3: Checking whether the varianceIntensity of the current word is greater than 2 times the average varianceIntensity of all the words in the sentence if(varianceIntensity[i]>2*(mean of all the words' varianceIntensity)) numOfRulesSatisfied=numOfRulesSatisfied+1//increment by 1
//Checking for Rule 4: Checking whether the varianceDerIntensity of the current word is greater than 0.9 times the average varianceDerIntensity of all the words in the sentence if(varianceDerIntensity[i]>0.9*(mean of all the words' varianceDerIntensity))//varianceDerIntensity means variance of intensity derivatives numOfRulesSatisfied numOfRulesSatisfied+1//increment by 1
//Checking for Rule 5: Checking whether the durationSyllableRatio of the current word is greater than the average durationSyllableRatio of all the words in the sentence if(durationSyllableRatio[i]>mean of all the words' durationSyllableRatio)   numOfRulesSatisfied=numOfRulesSatisfied+1//increment by
//Checking for Rule 6: Checking whether the meanRMS of the current word is greater than the average meanRMS of all the words in the sentence if(meanRMS[i]>mean of all the words' meanRMS) numOfRulesSatisfied=numOfRulesSatisfied+1//increment by 1
//Checking for Rule 7: Checking whether the maxRMS of the current word is greater than the average maxRMS of all the words in the sentence if(maxRMS[i]>mean of all the words' maxRMS) numOfRulesSatisfied=numOfRulesSatisfied+1//increment by 1
//Checking for Rule 8: Checking whether the wordType of the current word is equal to 1 (the word is a content word)(Wordtype=1=>content word, Wordtype=0=>functional word) if(wordType[i]==1)// (which means the word should be a content word) numOfRulesSatisfied=numOfRulesSatisfied+1//increment by 1 if(numOfRulesSatisfied>=4)//if majority of the rules are satisfied wordProminenceStatus[i]=1//flagging this word as a prominent (stressed)
//for the words whose property wordProminenceStatus is 1, those words are expressed in BOLD format for highlighting In FIG. 9, the approach for detection of prominent words begins at step 905, with the speech or audio segment extraction of each word. Then the acoustic features, as well as the lexical features at step 910, are extracted. The flow is then divided into the ML approach or the rule-based approach. Briefly, the ML approach includes step 915, selecting the relevant features, at step 920 feeding the features to the trained model, and then predicting the result in a range from 0 to 1. The alternate path of the rule-based approach includes at step 935 selecting the most helpful features, at step 940 applying the rule to the selected features, at step 945 computing the number of rules satisfied, and at step 950 determines if the majority is satisfied by labeling it as a 1 else if the majority is not satisfied then labeling it with a 0. The output of both paths, the ML and the rule-based paths is sent to step 930 for highlighting the word using bold, underline, script, etc. In exemplary embodiments, the rule-based paths yielded superior results than the ML method, but both solutions are feasible alternatives.

Figure 10:
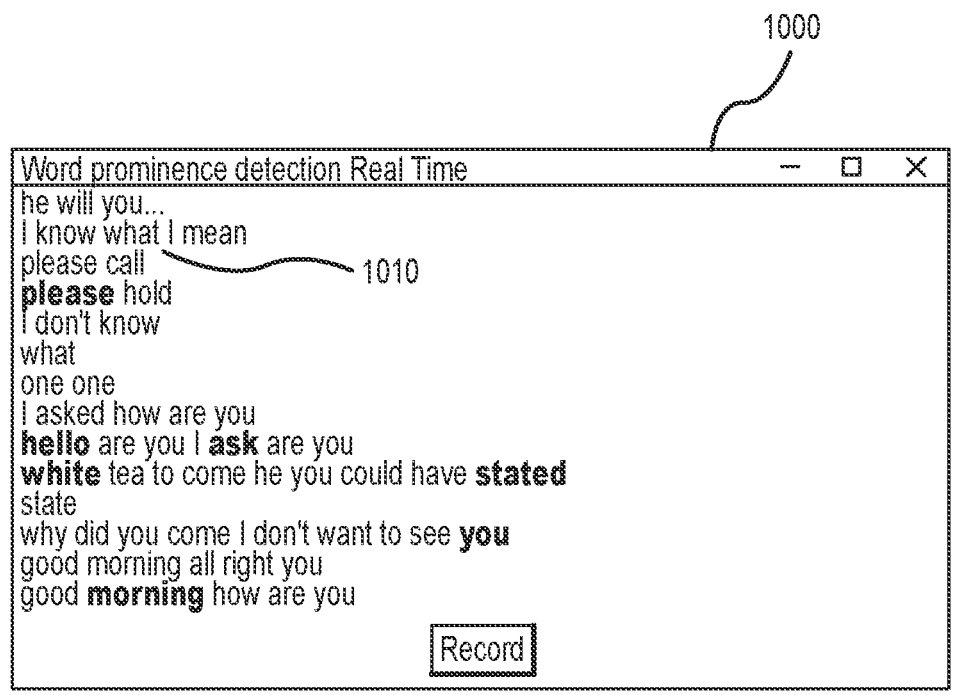
FIG. 10 illustrates an exemplary diagram of bolding prominent words for highlighting in visual presentations of emotion content in a speech to text communications in accordance with the exemplary embodiments described herein.

FIG. 10 is a diagram that illustrates the presentation of results of the output of prominent words detection and highlighting by the speech emotion recognition application in accordance with an embodiment. In FIG. 10, the GUI 1000 highlights portions of phrases that are shown in the GUI 1000. For example, the word "what" in the phrase "I know what mean" is highlighted or bolded.

Figure 11:
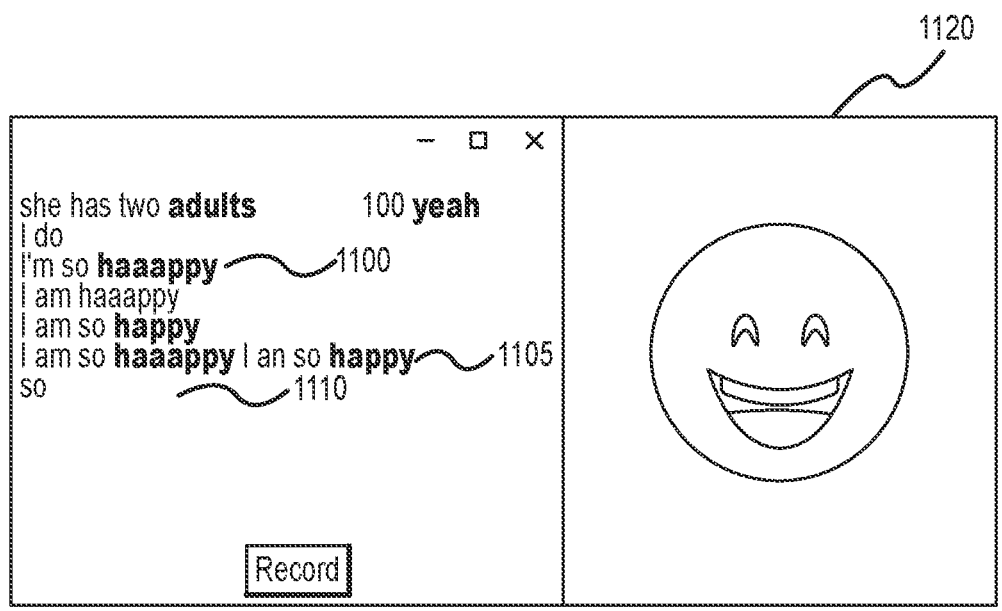
FIG. 11 illustrates an exemplary diagram of bolding prominent words and stretching the words to show excitement in visual presentations of emotion content in a speech to text communications in accordance with the exemplary embodiments described herein.

FIG. 11. illustrates a diagram of the presentation of results of incorporating emotion, word stretching, and word prominence detection by the speech emotion recognition application in accordance with an embodiment. In FIG. 11, the final output is shown as stretching vowels in words, for example in the word "happy" as "haaappy" 1100, bolding the words in the phrase "I am so haaappy I am so happy" to "I am so haaappy I am so happy" 1105. Finally, the phrase "so beautiful>tentative" 1110 can be illustrated to show prominence by bolding the words. In an exemplary embodiment, another color can also be used to show prominence (e.g. an alternative such as a color in red, etc. can show the prominence).

Figure 12:
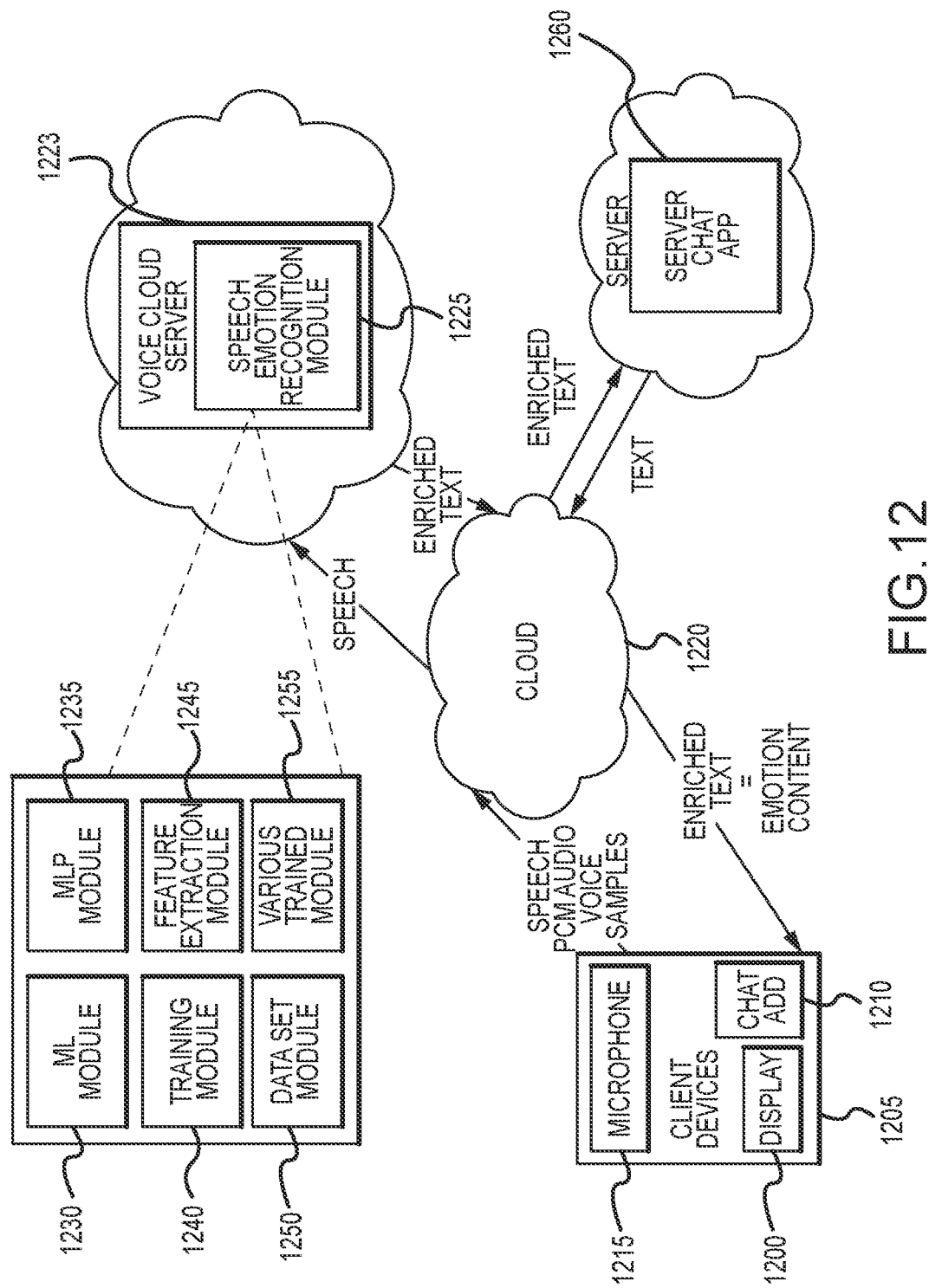
FIG. 12 illustrates an exemplary diagram of a cloud network of an emotion content recognition system in a speech to text communications in accordance with the exemplary embodiments described herein.

FIG. 12 illustrates a diagram of the network for the speech emotion recognition application in accordance with an embodiment. In various exemplary embodiments, the speech samples are sent from client devices to the cloud, the enriched text is sent from the cloud to the client device, the cloud sends the speech samples to the voice cloud server, and the voice cloud server sends the enriched text to the cloud. In FIG. 12, there is illustrated a client device 1205 which may include a series of client devices that are configured with the application platform to host a chat app 1210 and a microphone 1215 for receiving speech samples, audio packets, etc. . . . . The client device 1205 can be a set-top box configured with a voice remote, a smartphone, or for that matter any mobile device with processors capable of speech processing, text communication, and connecting with the network cloud 1220. The client device 1205 has a display 1200 for displaying text communication via the chat app 1210. In an exemplary embodiment, the client device 1205 sends voice samples from a user to the network cloud 1220 for speech-to-text conversion and enrichment with emotion content. The voice samples are received at a voice cloud server 1223 having a speech emotion recognition module containing processors for processing speech to text by implementing a speech emotion recognition application. The speech emotion recognition module 1225 is configured with various modules and software such as natural language processing module 1235 for converting speech to text, the machine learning module 1230 for implementing various deep learning models, rule-based models, a generating training and testing emotion recognition module (i.e. various trained models 1255), a data set module 1250 for storing data sets of recognized emotion data, and various trained modules 1255. Additional modules may be added or removed as required in the implementation of the speech emotion recognition system. In addition, the speech emotion recognition module 1225 communicates with a server chat app 1260 for enriching the text in the chat session between various client devices 1205. That is, the voice samples that are received by the voice cloud server 1223 are transposed into enriched text (i.e. stretched, highlighted, colored, added emoticons, etc.) text that is sent to the server chat app 1260 of inclusion, replacement or augmenting of the chat text communication between each of the client devices 1205.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the embodiments described herein are merely exemplary implementations.

The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method of enriching speech to text communications between users in a speech chat session using speech emotion recognition, the method comprising:
   applying a set of rules for speech emotion recognition to convert observed emotions in a speech sample and to enrich text with visual emotion content in the speech to text communications by:
   generating a data set of speech samples with labels of a plurality of emotion classes;
   selecting a set of acoustic features from each of the plurality of emotion classes;
   applying the set of rules for the speech emotion recognition based on at least one of the selected set of acoustic features and the data set of speech samples;
   computing a number of rules that have been satisfied from the set of rules for the speech emotion recognition that have applied to the selected set of acoustic features to label the selected set of acoustic features; and
   presenting the enriched text in speech-to-text communications in accordance with labeled acoustic features between users in the speech chat session for visual notice of the observed emotions in the speech sample.

2. The method of claim 1, further comprising:
   labeling the selected set of acoustic features based on a majority of rules of the computed number of rules has been satisfied.

3. The method of claim 1, further comprising:
   enriching text in the speech to text communications by changing a color of a select set of text of word in a phrase of a converted speech sample in the speech to text communications in the chat session for the visual notice of the observed emotion in the speech sample.

4. The method of claim 3, further comprising:
   enriching text in the speech to text communications by including an emoticon symbol and shading with one or more colors different parts of the emoticon symbol in the speech to text communications of the converted speech sample in the speech to text communications in the chat session for the visual notice of the observed emotion in the speech sample by the color shading in one or more of the different parts of the emoticon symbol.

5. The method of claim 4, further comprising:
   changing, dynamically and consistent with a change of the observed emotion in the speech sample, the color shading in one or more of the different parts of the emoticon symbol wherein the change in the color shading occurs gradually.

6. The method of claim 1, further comprising:
   changing, dynamically and consistent with a dramatic change of the observed emotion in the speech sample, a color shading in all different parts of an emoticon symbol at once.

7. The method of claim 1, further comprising:
   implementing the speech emotion recognition based on the set of rules to enable converting the observed emotions in speech samples to enrich text with the visual emotion content in the speech to text communications by:
   displaying the visual emotion content with text by a color mapping with emoticons; applying a threshold to compute duration of syllables of a phrase of words in the speech samples wherein each duration corresponds to a perceived excitement in the speech sample;
   implementing word stretching on a computed word duration and on a ratio of the computed word duration to syllables of phrases of a word in the speech sample to gauge intensity of words in the speech sample at a word level; and
   representing the perceived excitement in the speech samples by the word stretching and by highlighting particular words.

8. The method of claim 7, the highlighting of the particular words further comprising:
   bolding the word in a phrase for a prominence for the visual notice of the perceived excitement.

9. The method of claim 8, further comprising:
   stretching one or more letters in the word in the phrase for the prominence for the visual notice of the perceived excitement.

10. The method of claim 9, further comprising:
    computing the duration to syllable ratio based on a first, a second, and a third threshold, comprising:
    a first syllable count corresponding to a first duration to symbol ratio greater than a first threshold;
    a second syllable count corresponding to a second duration to the symbol ratio greater than a second threshold; and a third syllable count corresponding to a third duration to the symbol ratio greater than the third threshold.

11. A computer program product tangibly embodied in a computer-readable storage device and comprising instructions that when executed by a processor perform a method using speech emotion recognition for enriching speech to text communications between users in a speech chat session, the method comprising:
applying a set of rules for speech emotion recognition to convert observed emotions in a speech sample and to enrich text with visual emotion content in the speech to text communications by:
generating a data set of speech samples with labels of a plurality of emotion classes;
selecting a set of acoustic features from each of the plurality of emotion classes;
applying the set of rules for the speech emotion recognition based on at least one of the selected set of acoustic features and the data set of speech samples;
computing a number of rules that have been satisfied from the set of rules for the speech emotion recognition that have applied to the selected set of acoustic features to label the selected set of acoustic features; and
presenting the enriched text in speech-to-text communications in accordance with labeled acoustic features between users in the speech chat session for visual notice of the observed emotion in the speech sample.

12. The computer program product of claim 11, wherein the method further comprises:
enriching text in the speech to text communications by changing a color of a select set of text of word in a phrase of a converted speech sample in the speech to text communications in the chat session for the visual notice of the observed emotion in the speech sample.

13. The computer program product of claim 12, wherein the method further comprises:
enriching text in the speech to text communications by including an emoticon symbol and shading with one or more colors different parts of the emoticon symbol in the speech to text communications of the converted speech sample in the speech to text communications in the chat session for the visual notice of the observed emotion in the speech sample by the color shading in one or more of the different parts of the emoticon symbol.

14. The computer program product of claim 13, wherein the method further comprises:
changing, dynamically and consistent with a change of the observed emotion in the speech sample, the color shading in one or more of the different parts of the emoticon symbol, wherein the change in the color shading occurs gradually.

15. The computer program product of claim 13, wherein the method further comprises:
changing dynamically and consistent with a dramatic change of the observed emotion in the speech sample, the color shading in all the different parts of the emoticon symbol at once.

16. The computer program product of claim 11, wherein the method further comprises:
implementing the speech emotion recognition based on the set of rules to enable converting the observed emotions in speech samples to enrich text with the visual emotion content in the speech to text communications by:
displaying the visual emotion content with text by a color mapping with emoticons;
applying a threshold to compute duration of syllables of a phrase of words in the speech samples wherein each duration corresponds to a perceived excitement in the speech sample;
implementing word stretching on a computed word duration and on a ratio of the computed word duration to syllables of phrases of a word in the speech sample to gauge intensity of words in the speech sample at a word level; and
representing the perceived excitement in the speech samples by the word stretching and by highlighting particular words.

17. The computer program product of claim 16, wherein the highlighting of the particular words further comprises:
bolding the word in a phrase for a prominence for the visual notice of the perceived excitement.

18. The computer program product of claim 17, wherein the method further comprises:
stretching one or more letters in the word in the phrase for the prominence for the visual notice of the perceived excitement.

19. The computer program product of claim 18, wherein the method further comprises:
computing the duration to a syllable ratio based on a first, a second, and a third threshold, comprising:
a first syllable count corresponding to a first duration to symbol ratio greater than a first threshold;
a second syllable count corresponding to a second duration to the symbol ratio greater than a second threshold; and
a third syllable count corresponding to a third duration to the symbol ratio greater than the third threshold.

20. A system comprising:
at least one processor; and
at least one computer-readable storage device comprising instructions that when executed causes performance of a method for processing speech samples using speech emotion recognition for enriching speech to text communications between users in a speech chat, the system comprising:
a set of rules for the speech emotion recognition implemented by the processor to convert observed emotions in a speech sample and to enrich text with visual emotion content in the speech to text communications, wherein the processor configured to:
generate a data set of speech samples with labels of a plurality of emotion classes;
extract a set of acoustic features from each emotion class;
apply the set of rules for the speech emotion recognition based on at least one of a selected set of acoustic features and the data set of speech samples;
compute a number of rules that have been satisfied from the set of rules for the speech emotion recognition applied to the selected set of acoustic features to label the selected set of acoustic features; and
present the enriched text in the speech to text communications in accordance with labeled acoustic features between users in a speech chat session for visual notice of the observed emotion in the speech sample.

* * * * *